United States Patent
Grosse et al.

(10) Patent No.: US 10,330,865 B2
(45) Date of Patent: Jun. 25, 2019

(54) METHOD OF ARRANGING OPTICAL FIBER ENDS OPPOSITE WAVEGUIDE ENDS

(71) Applicant: Commissariat à l'Energie Atomique et aux Energies Alternatives, Paris (FR)

(72) Inventors: Philippe Grosse, Sassenage (FR); Jean-François Carpentier, Grenoble (FR); Patrick Le Maitre, Biviers (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/924,987

(22) Filed: Mar. 19, 2018

(65) Prior Publication Data
US 2018/0267244 A1 Sep. 20, 2018

(30) Foreign Application Priority Data
Mar. 20, 2017 (FR) ...................... 17 52269

(51) Int. Cl.
*G02B 6/42* (2006.01)
*G02B 6/43* (2006.01)
(Continued)

(52) U.S. Cl.
CPC .............. *G02B 6/262* (2013.01); *G02B 6/12* (2013.01); *G02B 6/30* (2013.01); *G02B 6/4221* (2013.01);
(Continued)

(58) Field of Classification Search
CPC ...... G02B 6/262; G02B 6/422; G02B 6/4221; G02B 6/4222; G02B 6/4224;
(Continued)

(56) References Cited

U.S. PATENT DOCUMENTS

| | | | | |
|---|---|---|---|---|
| 5,914,207 A | * | 6/1999 | Nishiki .............. | G02B 6/02123 385/147 |
| 6,118,913 A | * | 9/2000 | O'Connor .......... | B29C 65/1616 264/1.37 |

(Continued)

FOREIGN PATENT DOCUMENTS

GB 2374156 A 10/2002

OTHER PUBLICATIONS

"Measurement of the angular distribution of light scattered from a glass fiber optical waveguide" by Rawson, Applied Optics, vol. 11, No. 11, pp. 2477-2481, 1972.*
(Continued)

*Primary Examiner* — Robert Tavlykaev
(74) *Attorney, Agent, or Firm* — Moreno IP Law LLC

(57) ABSTRACT

A method of arranging a network of optical fiber ends opposite a corresponding network of waveguide ends of a semiconductor wafer displaceable with respect to each other in orthogonal directions X and Y, the method including: arranging the fibers so that the network ends have the same orientation and that the projection of the axis of each fiber on the wafer is parallel to direction Y; injecting, into one of the fibers, a light beam having a wavelength such that light is scattered from the fiber walls, locating the fiber axis, and displacing the fibers or the wafer in direction X to align a characteristic point in line with the projection of the fiber axis on the wafer.

15 Claims, 5 Drawing Sheets

(51) Int. Cl.
*G02B 6/26* (2006.01)
*G02B 6/12* (2006.01)
*G02B 6/30* (2006.01)
G02B 6/10 (2006.01)
G02B 6/36 (2006.01)

(52) U.S. Cl.
CPC ............. *G02B 6/4228* (2013.01); *G02B 6/43* (2013.01); *G02B 6/102* (2013.01); *G02B 6/3636* (2013.01); *G02B 6/4225* (2013.01)

(58) Field of Classification Search
CPC .. G02B 6/4227; G02B 6/4228; G02B 6/4233; G02B 6/4234
USPC ....................................... 385/31, 37, 52, 147
See application file for complete search history.

(56) References Cited

U.S. PATENT DOCUMENTS

| | | | |
|---|---|---|---|
| 6,618,514 B1 | 9/2003 | Cole | |
| 7,262,852 B1 * | 8/2007 | Gunn, III | G02B 6/12007 250/559.4 |
| 7,586,608 B1 | 9/2009 | Gunn, III et al. | |
| 8,620,123 B2 * | 12/2013 | Dean, Jr. | G02B 6/02033 385/102 |
| 9,568,684 B2 * | 2/2017 | Bradley | G02B 6/3885 |
| 9,671,551 B2 * | 6/2017 | Dean, Jr. | G02B 6/02033 |
| 2005/0220437 A1 | 10/2005 | Kim et al. | |
| 2015/0043878 A1 * | 2/2015 | Chen | G02B 6/02042 385/126 |
| 2015/0055923 A1 * | 2/2015 | Saito | G02B 6/02042 385/126 |

OTHER PUBLICATIONS

Preliminary Search Report in French Patent Application No. 1752269 dated Nov. 20, 2017, 2 pages.

* cited by examiner

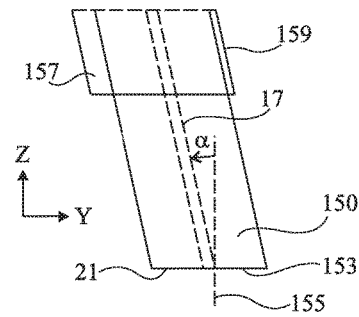
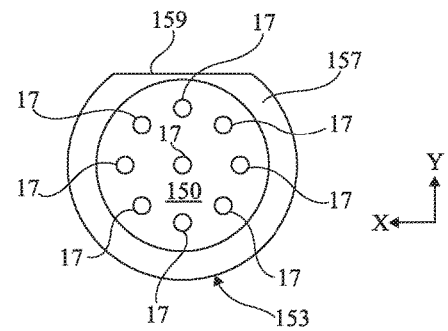
Fig 7A　　　　　　　　Fig 7B
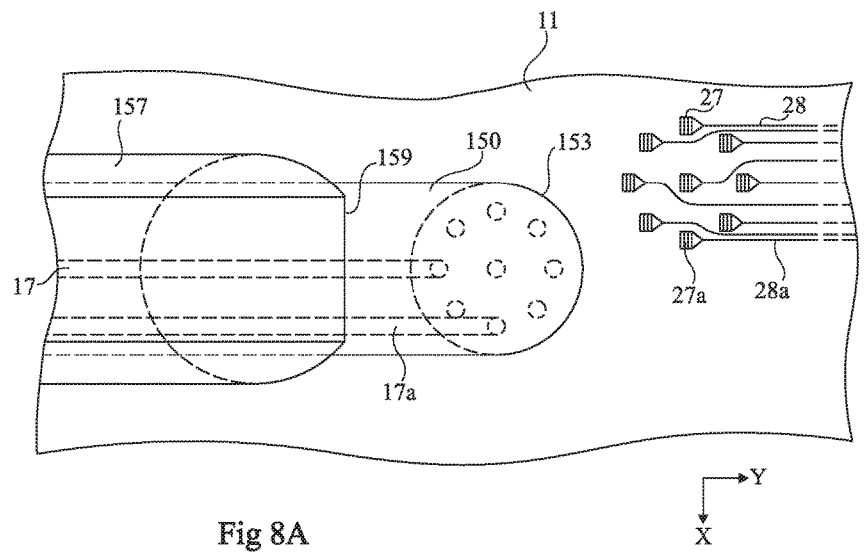
Fig 8A

METHOD OF ARRANGING OPTICAL FIBER ENDS OPPOSITE WAVEGUIDE ENDS This application claims the priority benefit of French patent application number 17/52269, the content of which is hereby incorporated by reference in its entirety to the maximum extent allowable by law.

BACKGROUND

The present disclosure relates to a method of arranging ends of optical fibers opposite ends of waveguides of a semiconductor wafer. The present disclosure also relates to a test station capable of implementing such a method.

DISCUSSION OF THE RELATED ART

Integrated optical circuits comprising waveguides are currently manufactured from a wafer of a semiconductor material, or semiconductor wafer. The wafer is then sawn to obtain a plurality of individual chips.

Before the sawing step, tests are performed to verify that the optical circuits are functional. To test an optical integrated circuit, a light signal at the operating wavelength of the circuit is injected at the level of an optical input of the circuit, and an output light or electric signal is observed at a corresponding output of the circuit. Each optical input or output of the circuit is for example formed of a network coupling to an end of a waveguide. During the test, an optical fiber is used to inject the light signal into the circuit. To achieve this, the fiber is brought above the integrated optical circuit, the position of the end of the fiber is located, and the fiber is displaced with respect to the semiconductor wafer so that the end of the fiber, that is, the end of its core, is roughly positioned opposite an optical input of the circuit. A fine adjustment is then performed by slightly displacing the end of the fiber with respect to this optical input while measuring the value of a corresponding output signal. The final adjustment is achieved when the value of this output signal is maximum. When the output signal is a light signal, it is also necessary to position the end of an optical fiber opposite the corresponding optical output. More generally, to test a circuit, a plurality of ends of optical fibers may be placed opposite a plurality of optical inputs and/or outputs of the circuit.

The increase in the number of optical inputs and outputs of the circuit to be tested causes an increase in the number of steps of arranging optical fiber ends opposite the optical inputs and outputs. This results in an increase in the duration of the circuit testing, which is not desirable.

To overcome this increase of the test time, a plurality of optical fiber ends are simultaneously placed opposite a plurality of ends of waveguides of an integrated optical circuit. To achieve this, a bundle of parallel optical fibers having their ends all belonging to a same plane, where they form a network, is used. The bundle of optical fibers is arranged in a holding device comprising a marker for orienting the holding device, and thus the fiber bundle. For example, a bundle of optical fibers organized in a bar in a glass block is used, the ends of the fibers being flush with a lower surface of the glass block. According to another example, a fiber bundle arranged in a ferrule is used, the fibers being regularly distributed around a central fiber, sharing a same cladding, and having their ends flush with a transverse surface of the cladding. Further, at the upper surface of the semiconductor wafer, corresponding ends of waveguides of the circuit form a network identical to that of the ends of the fibers, such a network arrangement of the waveguide ends being provided on design of the circuit to be tested. During a test phase, the fiber bundle is arranged above the upper surface of the semiconductor wafer so that the ends of the fibers are opposite this upper surface. The fiber bundle and/or the wafer are then displaced with respect to each other to place the network of optical fiber ends opposite the network of waveguide ends, each optical fiber end then being opposite a corresponding end of a waveguide.

However, in top view, it is not possible to visualize the ends of the fibers. Further, during the alignment step, the holding device may come and mask the waveguide ends. This raises an issue to place the ends of the fibers opposite the waveguide ends.

A usual solution comprises accurately determining the positions of the ends of the fibers relative to the marker of the fiber bundle holding device, positioning the marker with respect to the waveguide end network, and then displacing the holding device based on the position of the marker relative to the waveguide ends and on the position of the fiber ends relative to the marker. However, a calibration step requiring specific equipment such as an accurate calibrated microscope is then required to determine the position of the fiber ends relative to the marker.

It would thus be desirable to have a method, simpler and taking less time to implement than existing methods, for arranging fiber ends opposite ends of waveguides of a semiconductor wafer. It would also be desirable to have a test station automatically implementing at least certain steps of such an alignment method.

SUMMARY

Thus, an embodiment provides a method of arranging a network of coplanar ends of optical fibers of a bundle of parallel fibers opposite a corresponding network of ends of waveguides of a semiconductor wafer, the bundle of fibers and the wafer being displaceable with respect to each other in first and second orthogonal directions, the method comprising the successive steps of: a) arranging the fiber bundle above the wafer so that the network ends have the same orientation relative to the first and second directions and the projection of the axis of each of the fibers on the wafer is parallel to the second direction; b) injecting, into one of the fibers, a light beam having a wavelength such that light is scattered from the walls of the fiber, locating the fiber axis based on the scattered light, and displacing the fiber bundle and the wafer with respect each other in the first direction to align a characteristic point of the wafer in line with the projection of the axis of the fiber on the wafer; and c) displacing the fiber bundle and the wafer with respect to each other until the end of the fiber is located opposite a corresponding waveguide end.

According to an embodiment, the characteristic point corresponds to said end of a waveguide, step c) comprising a step c1) of displacing the wafer and the fiber bundle with respect to each other in the second direction until the end of the fiber is located opposite said point.

According to an embodiment, the characteristic point corresponds to an end of an auxiliary waveguide and the position of the characteristic point relative to said end of a waveguide is known, step c) successively comprising: a step c1) of displacing the wafer and the fiber bundle with respect to each other in the second direction until the end of the fiber is located above the characteristic point; and a step c2) of displacing the wafer and the fiber bundle with respect to each other based on the known position of the point relative to said end of a waveguide.

According to an embodiment, at step c1), the displacement is stopped when the quantity of light received at the characteristic point is maximum.

According to an embodiment, the wafer comprises a graduated vernier in the second direction, the method further comprising: at the end of step c1), locating the position of the fiber bundle on the vernier; and, during a subsequent alignment of said ends of fibers on said ends of waveguides, carrying out steps a) and b) and then a step of displacing the wafer and the holding device with respect to each other in the second direction all the way to the located position.

According to an embodiment, at step c), a light beam having a wavelength adapted to the fiber is injected into the fiber.

According to an embodiment, the fiber and the waveguides are capable of transmitting a light signal having a wavelength in the range from 1.3 to 1.5 µm.

According to an embodiment, at step b), the wavelength of the beam is in the range from 600 to 780 nm.

According to an embodiment, the fibers share a same cladding.

According to an embodiment, the fibers are organized in a bar.

According to an embodiment, the fiber bundle is arranged in a holding device comprising an orientation marker, step a) comprising aligning the orientation marker with the first direction.

According to an embodiment, the upper surface of the wafer is substantially parallel to the first and second directions and, at step a), the plane of the ends of the optical fibers is made substantially parallel to the first and second directions.

According to an embodiment, the fibers are inclined with respect to the normal to the plane of the fiber ends.

Another embodiment provides a test station capable of implementing the above method.

According to an embodiment, step b) is implemented in automated fashion in the test station.

BRIEF DESCRIPTION OF THE DRAWINGS

The foregoing and other features and advantages will be discussed in detail in the following non-limiting description of specific embodiments in connection with the accompanying drawings.

FIGS. 7A and 7B are simplified views of another example of a fiber bundle in the case where the fiber ends are regularly distributed around an end of a central fiber; and FIGS. 8A to 8C are simplified views illustrating successive steps of an embodiment of a method of arranging ends of the fibers of the bundle of FIGS. 7A and 7B opposite waveguide ends.

DETAILED DESCRIPTION OF THE PRESENT EMBODIMENTS

Figure 1:
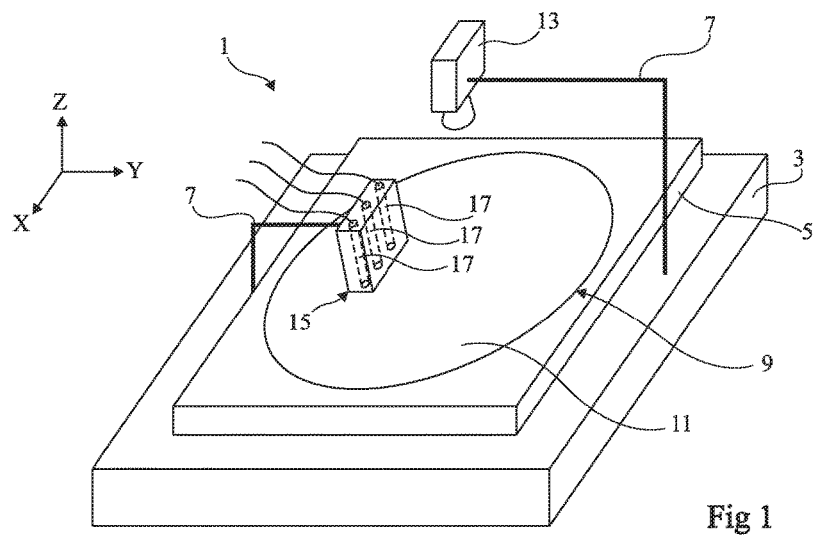
FIG. 1 is a simplified perspective view of a test station capable of implementing a method of arranging ends of optical fibers of a bundle opposite waveguide ends.

The same elements have been designated with the same reference numerals in the various drawings and, further, the various drawings are not to scale. For clarity, only those steps and elements which are useful to the understanding of the described embodiments have been shown and are detailed.

In the following description, terms "top", "bottom", "upper", and "lower" refer to the representation of the concerned elements in the corresponding drawings. Unless otherwise specified, term "approximately" and expression "in the order of" means to within 10%, preferably to within 5%.

FIG. 1 is a simplified perspective view of a test station capable of implementing a method of arranging ends of elementary optical fibers opposite a corresponding network of waveguide ends of a semiconductor wafer. In the example described hereafter, each elementary fiber comprises a core provided with its own cladding.

Test station 1 comprises, in an orthogonal reference frame defined by three directions or axes X, Y, and Z, a frame 3 supporting a mobile table 5 having its upper surface parallel to the plane defined by directions X and Y. Test station 1 further comprises arms 7 rigidly attached to frame 3 and intended to support various elements useful for the testing of an integrated optical circuit of a semiconductor wafer.

During a test phase, a semiconductor wafer 9 comprising integrated optical circuits to be tested is placed on the upper surface of table 5. The ends (not shown) of the waveguides of the integrated optical circuits to be tested are on the side of upper surface 11 of wafer 9. An image acquisition device 13, for example, a camera, possibly associated with a microscope, is assembled at the end of an arm 7, above semiconductor wafer 9, to obtain images of upper surface 11 of wafer 9. Device 13 is for example adapted to visible light having a wavelength in the range from approximately 380 to 780 nm. In this example, a parallelepipedal glass block 15 having a bundle of elementary optical fibers 17 organized in a bar arranged therein is assembled at the end of another arm 7. The elementary fibers are parallel to one another and distributed with a regular pitch. The end of arm 7 supporting block 15 and/or table 5 supporting semiconductor wafer 9 comprise means for displacing the end of arm 7 and table 5 with respect to each other in directions X and Y.

Figure 2A:
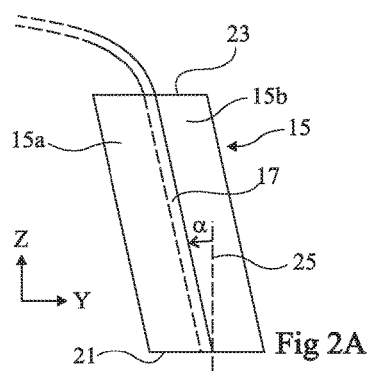
FIGS. 2A and 2B are simplified views of an example of a fiber bundle in the case where the fiber ends are aligned.
Figure 2B:
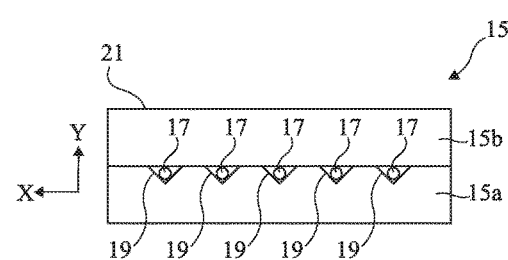

FIGS. 2A and 2B are respective simplified side and bottom views of glass block 15.

In this example, block 15 is formed of two glass plates 15a and 15b glued to each other. Plate 15a comprises grooves 19 at the level of its surface glued to plate 15b, for example, V-shaped grooves. Each groove 19 has one of elementary fibers 17 of the bar arranged therein. In this example, the bar comprises five elementary fibers 17, it being understood that a bar may comprise any number of elementary fibers greater than or equal to two. The ends of elementary fibers 17 are aligned and coplanar to the level of lower surface 21 of block 15. At the level of upper surface 23 of block 15, elementary fibers 17 extend, to be connected, for example, to light beam sources or to light signal acquisition devices. It is here considered that such extensions of elementary optical fibers 17 do not form part of the bar. Further, to optimize the coupling of the fibers with the waveguide end coupling networks, angle α between normal 25 to lower surface 21 of block 15 and the axis of each fiber 17 of the bar is non zero. This angle is selected according to the coupling networks used, and is for example in the range from 3 to 15°, for example, 8°. It should be noted that, in the case where elementary fibers 17 are polarization maintaining fibers, their orientation in block 15 is advantageously selected according to the coupling networks used, which may be sensitive to the polarization of light.

As an example, the core of an elementary fiber 17 capable of transmitting light at a wavelength in the range from 1.3 to 1.5 µm (near infrared) has a diameter of approximately 7 µm. When a light signal having a wavelength smaller than the cut-off wavelength of the elementary fiber is injected into the fiber, light scatters or escapes from its walls. The cut-off wavelength depends on the elementary fiber used and corresponds to the wavelength below which the fiber is no longer monomode. An example of a fiber adapted to infrared is the fiber designated by trade name SMF28, which fiber has a 1,260-nm cut-off wavelength. For a block 15 provided with eight elementary fibers adapted to near infrared and distributed with a pitch which, according to current standards, currently is 127 or 250 µm, lower surface 21 of block 15 for example has a width of approximately 2 mm for a length of approximately 4.5 mm.

Figure 3A:
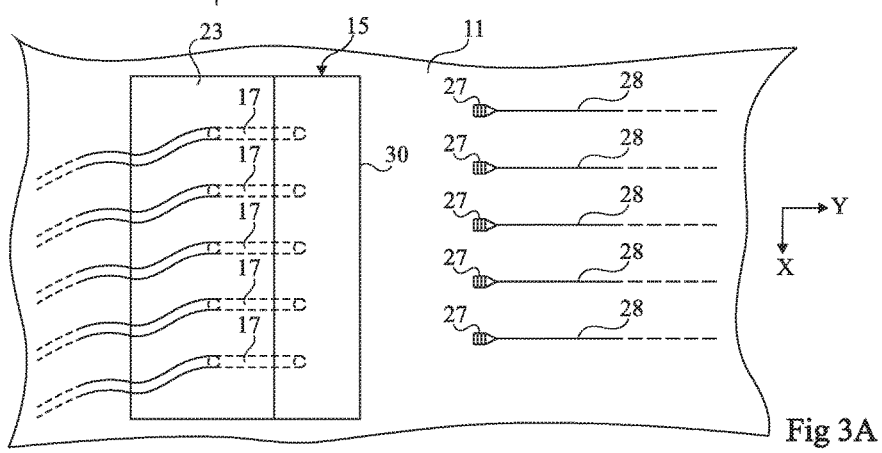
FIGS. 3A to 3C are simplified views illustrating successive steps of an embodiment of a method of arranging aligned ends of the fibers of the bundle of FIGS. 2A and 2B opposite aligned waveguide ends.
Figure 3B:
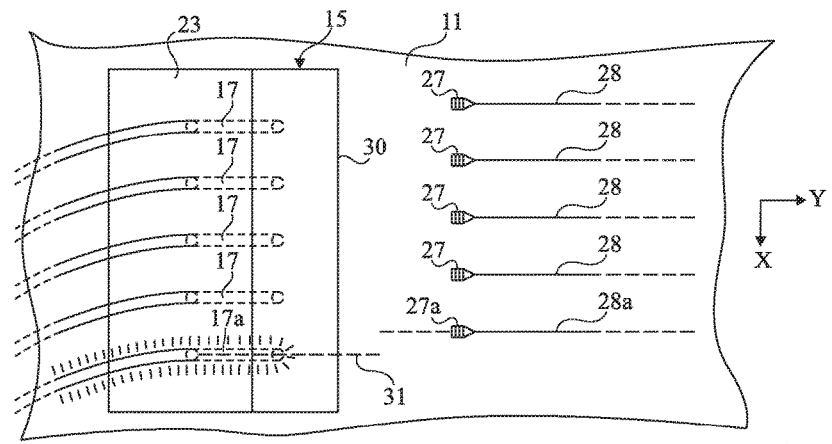
Figure 3C:
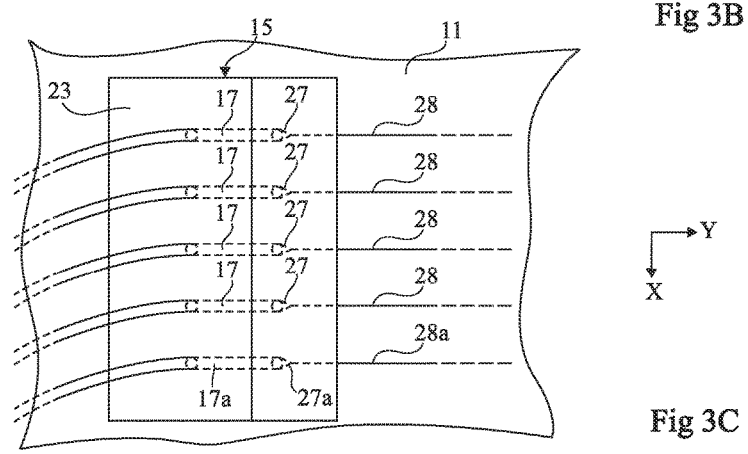

FIGS. 3A to 3C are simplified top views showing block 15 arranged above semiconductor wafer 9, these views for example corresponding to image obtained via image acquisition device 13 of FIG. 1. The drawings illustrate successive steps of an embodiment of a method of arranging aligned ends of elementary fibers 17 opposite aligned waveguide ends.

FIG. 3A illustrates a preliminary step of the method. At this step, wafer 9 is arranged on table 5 so that its upper surface 11 is substantially parallel to the plane defined by directions X and Y. Semiconductor wafer 9 is also arranged so that the orientation of the alignment of ends 27 of waveguides 28 is known, for example, so that the coupling networks 27 forming the aligned ends of waveguides 28 are aligned parallel to direction X. For this purpose, wafer 9 may comprise a marker, for example, a landing on its peripheral edge. Block 15 provided with the bar of elementary optical fibers 17 is arranged so that its lower surface 21 faces upper surface 11 of wafer 9, and is substantially parallel thereto. The plane of the ends of elementary fibers 17 is then substantially parallel to semiconductor wafer 9 and the axes of elementary fibers 17 are inclined with respect to direction Z. Further, block 15 is arranged so that the orientation of the alignment of the ends of elementary fibers 17 is identical to that of the alignment of ends 27 of waveguides 28, that is, the alignment of the ends of elementary fibers 17 is parallel to direction X in the present example. This is for example achieved by modifying the orientation of block 15 to make a large edge 30 of its lower surface 21 parallel to direction X, edge 30 being visible in top view, parallel to the alignment of the ends of elementary fibers 17 and used as an orientation marker for block 15. The projection of the axis of each of elementary fibers 17 on semiconductor wafer 9 is then parallel to direction Y. The implementation of the preliminary steps of orientation of wafer 9 and of block 15 of elementary fibers 17 is within the abilities of those skilled in the art.

In FIG. 3B, at a next step, a light beam is injected into one, 17a, of the elementary fibers 17 of the bar. The wavelength of the injected light, preferably in the form of a laser beam, is selected outside of the wavelength range for which elementary fibers 17 are provided, for example, smaller than the cut-off wavelength of the elementary fiber, whereby this light is scattered from the walls of elementary fiber 17a. The wavelength of the injected light is for example selected to obtain a power of light scattered from the walls of elementary fiber 17a which is greater than 1 µW per fiber centimeter, preferably greater than 3 µW per fiber centimeter. The wavelength is further selected so that block 15 is at least partly transparent to this wavelength so that elementary fiber 17a can be distinguished through block 15. Axis 31 of elementary fiber 17a can then be located. Preferably, the wavelength of the injected light is adapted to image acquisition device 13. Thereby, the light diffused by elementary fiber 17a is visible on the images provided by device 13 and axis 31 of elementary fiber 17a may be directly located on the images.

As an example, for an acquisition device 13 adapted to visible light, and for elementary fibers 17 and a circuit to be tested adapted to light in close infrared, the light injected into elementary fiber 17a may have a wavelength in the range from 600 to 780 nm, for example, 630 nm. According to a more specific example, the fibers are SMF28 fibers and the light signal source supplies a laser signal at a wavelength from approximately 780 to 785 nm, and at a 10-mW power, whereby a light power of approximately 4 µW is scattered per fiber centimeter.

Semiconductor wafer 9 and block 15 are then displaced with respect to each other, in direction X, until end 27 of a waveguide 28, respectively called 27a and 28a hereafter, is in line with the projection of axis 31 of elementary fiber 17a on upper surface 11 of semiconductor wafer 9. During this displacement, when the wavelength of the injected light is adapted to image acquisition device 13, the position of axis 31 of elementary fiber 17a with respect to end 27a of waveguide 28a may be viewed on the images supplied by device 13. Once this displacement along direction X is finished, the source supplying the light beam to elementary fiber 17a may be turned off.

In FIG. 3C, at a next step, semiconductor wafer 9 and block 15 have been displaced with respect to each other in direction Y until the end of elementary fiber 17a is located opposite end 27a of waveguide 28a. When end 27a of waveguide 28a is an optical input of the circuit to be tested, this may be achieved as follows. A light signal at the operating wavelength of the circuit and of elementary fibers 17 is injected into elementary fiber 17a, preferably in the form of a laser beam. During the displacement of wafer 9 and of block 15 with respect to each other in direction Y, at the time when the end of elementary fiber 17a arrives opposite end 27a of waveguide 28a, the light signal is transmitted to the circuit. This is detected by observing the value of a corresponding output signal, which then reaches a maximum value. When the observed output signal is a light signal, it is for example observed via an additional elementary optical fiber having one end arranged opposite the corresponding optical output and having its other end coupled to a photodetector.

Once the end of elementary fiber 17a has been arranged opposite end 27a of waveguide 28a, due to the preliminary orientation steps described in relation with FIG. 3A, each of the ends of elementary optical fibers 17 is located opposite a corresponding end 27 of a waveguide 28. A fine adjustment can then be performed, as previously described for a single fiber and a single waveguide, by displacing block 15 and wafer 9 with respect to each other to maximize the value of a corresponding output signal. The test phase can then start.

Figure 4:
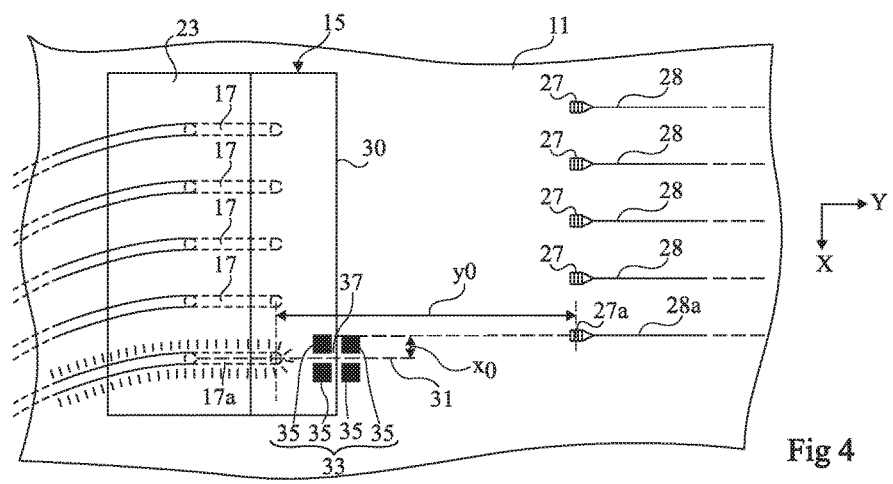
FIGS. 4 to 6 illustrate alternative embodiments of the method of FIGS. 3A to 3C.

FIG. 4 is a view similar to that of FIGS. 3A to 3C and illustrates an alternative embodiment of the above-described method.

In this variation, a marker 33 is present on upper surface 11 of semiconductor wafer 9. Distance x0 in direction X between marker 33 and end 27a of waveguide 28a is known.

In this example, marker 33 is formed of four squares 35 arranged to define a cross 37 having one arm parallel to direction X and having its other arm parallel to direction Y. After having carried out the steps described in relation with FIG. 3A, axis 31 of elementary fiber 17a is located as described in relation with FIG. 3B. Block 15 and table 5 are displaced with respect to each other in direction X to align marker 33, in this example, the arm of marker 33 parallel to direction Y, in line with the projection of axis 31 of elementary fiber 17a on semiconductor wafer 9. Block 15 and wafer 9 are then displaced with respect to each other in direction Y until edge 30 of block 15 is above marker 33, that is, above the arm of marker 33 parallel to direction X in the present example. FIG. 4 shows the position of block 15 above wafer 9 after these steps. Block 15 and semiconductor wafer 9 are then displaced with respect to each other in direction X by known distance x0, end 27a of waveguide 28a then being aligned in line with the projection of axis 31 on semiconductor wafer 9. Wafer 9 and block 15 are then displaced with respect to each other in direction Y as described in relation with FIG. 3C, until the end of elementary fiber 17a is located opposite end 27a of waveguide 28a.

Preferably, distance y0 of the last displacement in the Y direction is stored so that, when the method is subsequently implemented, after block 15 has been aligned with marker 33 as shown in FIG. 4, it is sufficient to displace block 15 and wafer 9 with respect to each other by known distance x0 in direction X and by stored distance y0 in direction Y to place the ends of elementary fibers 17 opposite ends 27 of waveguides 28. This results in a time gain when the method is subsequently implemented.

Advantageously, the alignment of marker 33 in line with the projection of axis 31 on upper surface 11 of semiconductor wafer 9 is generally more accurate than the alignment of end 27a in line therewith.

Figure 5:
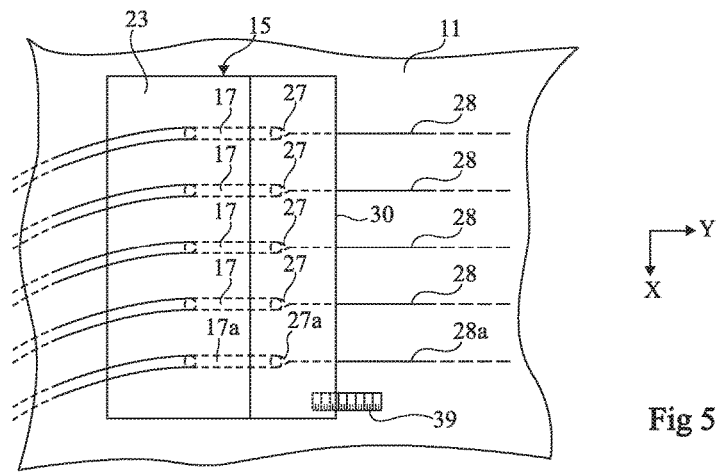

FIG. 5 is a view similar to that of FIG. 3C and illustrates another alternative embodiment of the above-described method.

In this variation, a vernier 39 graduated in direction Y is present on upper surface 11 of semiconductor wafer 9. The method described in relation with FIGS. 3A to 3C is implemented for a first time. Once the step of FIG. 3C is over, the position of edge 30 of block 15, and thus of elementary fiber bundle 17, is located on vernier 39. Thus, when the alignment method is subsequently implemented, the step of FIG. 3C is replaced with a step of moving semiconductor wafer 9 and block 15 with respect to each other in direction Y until edge 30 is at the previously-located position. This results in a time gain for the subsequent implementation of the method.

In the above-described method and variations thereof, end 27a of waveguide 28a forms a characteristic point of upper surface 11 of semiconductor wafer 9 and the end of elementary fiber 17a is directly arranged opposite end 27a of waveguide 28a, possibly by using a marker 33. In another variation, the end of elementary fiber 17a is first placed opposite an intermediate characteristic point, different from end 27a of waveguide 28a, before being placed opposite end 27a.

Figure 6:
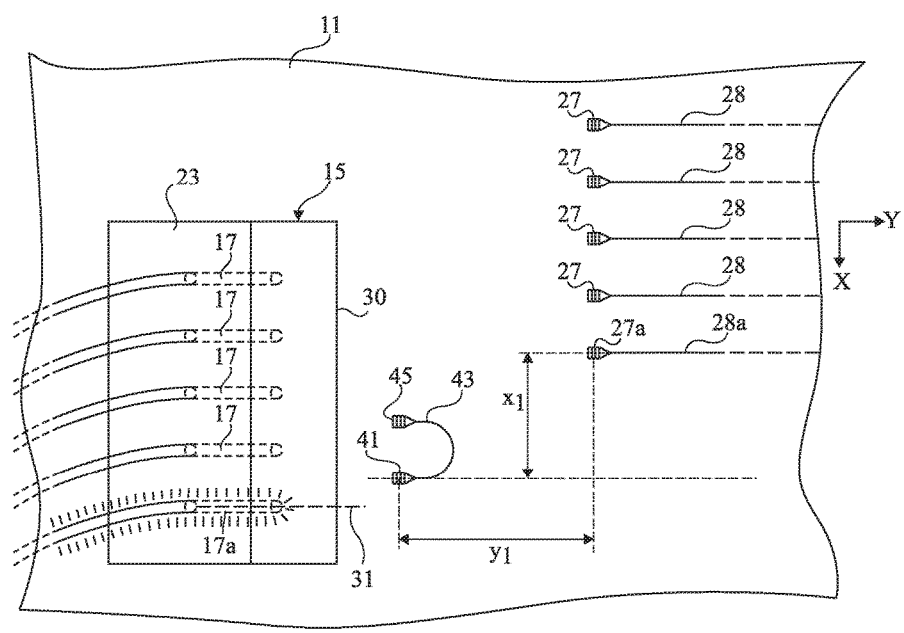

FIG. 6 is a view similar to that of FIG. 3B and illustrates this other alternative embodiment.

In this variation, the characteristic point 41 of upper surface 11 of semiconductor wafer 9 corresponds to an end 41 of an auxiliary waveguide 43. Distance x1 in direction X and distance y1 in direction Y which separate characteristic point 41 from end 27a of guide 28a are known. In the example shown herein, the other end 45 of waveguide 43 is aligned with characteristic point 41, parallel to direction X, and ends 41 and 45 of waveguide 43 are separated from each other by a distance corresponding to that separating two elementary fibers 17 from the bar.

The orientation steps described in relation with FIG. 3A are carried out. The steps described in relation with FIGS. 3B and 3C are then carried out, with the difference that the end of elementary fiber 17a is first placed opposite characteristic point 41 rather than opposite end 27a of waveguide 28a. Advantageously, in this example, when the end of elementary fiber 17a is located opposite point 41, another elementary optical fiber 17 of the bar has its end opposite end 45 of waveguide 43. As a result, the time when the intensity of the light signal received via this other elementary fiber 17 is maximum corresponds to the time when the end of elementary fiber 17a is located opposite point 41. Semiconductor wafer 9 and block 15 are then moved with respect to each other by distance x1 in direction X and distance y1 in direction Y to place the end of elementary fiber 17a opposite end 27a of waveguide 28a.

FIGS. 7A and 7B schematically show another example of an elementary fiber bundle 17 in the case where the elementary fibers share a same cladding 150, for example, made of glass, and are regularly spaced apart around a central elementary fiber. FIG. 7A is a side view of the beam, a single elementary fiber 17 being shown in dotted lines in FIG. 7A and FIG. 7B is a bottom view of an output surface 153 of cladding 150 having the ends of elementary fibers 17 flush therewith. As previously, elementary fibers 17 are parallel to one another, their ends are coplanar at the level of surface 153, and the axes of elementary fibers 17 are inclined by an angle α with respect to the normal 155 to this surface 153. In this example, the holding device having cladding 150 arranged therewith is a metal ferrule 157, the end of cladding 150 jutting out of metal ferrule 157. Metal ferrule 157 comprises an orientation marker, in this example, a landing 159, to orient elementary fiber bundle 17.

Figure 8B:
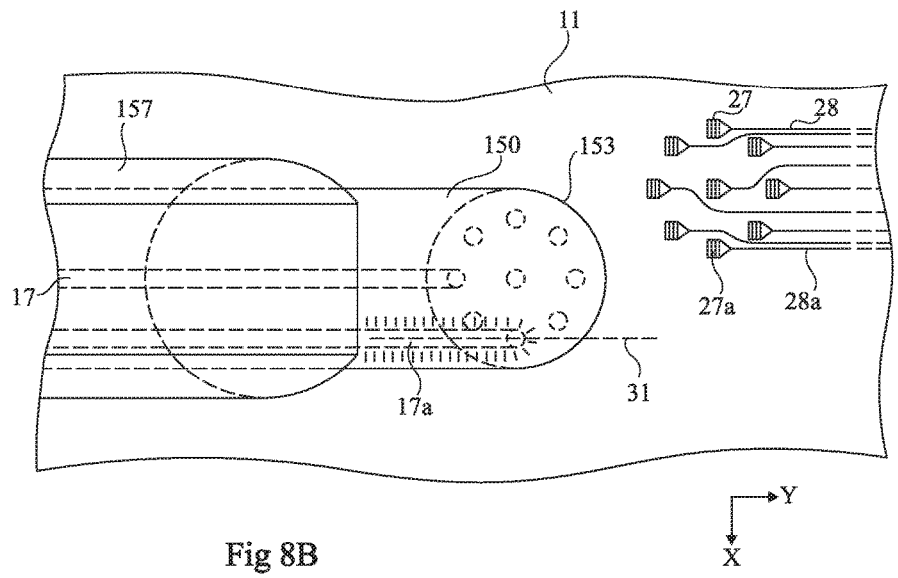
Figure 8C:
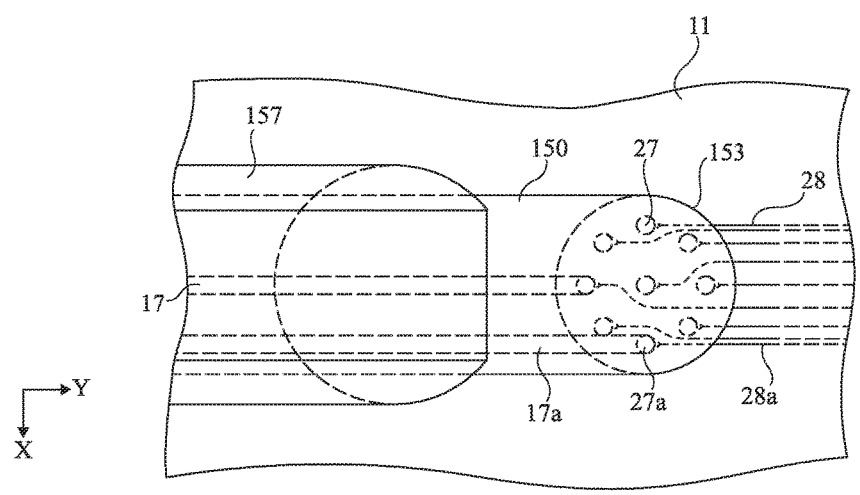

FIGS. 8A to 8C are simplified top views showing elementary fiber bundle 17 when metal ferrule 157 is assembled instead of block 15 in test station 1. These drawings illustrate successive steps of the method of arranging the ends of elementary fivers 17 opposite ends 27 of waveguides 28 and for example correspond to images obtained via image acquisition device 13 of FIG. 1. In these drawings, two elementary fibers 17 only are shown in dotted lines.

FIG. 8A illustrates the preliminary orientation steps described in relation with FIG. 3A, applied to elementary fiber bundle 17 of FIGS. 7A and 7B.

Metal ferrule 157 is arranged so that the ends of elementary fibers 17 are opposite upper surface 11 of semiconductor wafer 9, upper surface 11 of wafer 9 being substantially parallel to surface 153 of cladding 150, and thus to the plane of the ends of elementary fibers 17. At the upper surface 11 of wafer 9, ends 27 of waveguides 28 form a network identical to the network of the ends of elementary fibers 17 at surface 153 of cladding 150. Semiconductor wafer 9 and ferrule 157 are arranged so that the network of ends 27 of waveguide 28 is oriented in the same way as the network of ends of elementary fibers 17, and that the projection of the axis of each of elementary fibers 17 on semiconductor wafer 9 is parallel to direction Y. For example, landing 159 of metal ferrule 157 is made parallel to direction X, and wafer 9 is accordingly oriented as shown in FIG. 8A.

In FIG. 8B, at a next step corresponding to the step of FIG. 3B, a light beam is injected into an elementary fiber 17a so that light is scattered from its walls, and axis 31 of elementary fiber 17a is located at the level of the portion of cladding 150 jutting out of ferrule 157. Semiconductor wafer 9 and elementary fiber beam 17 are then moved with respect to each other in direction X until the end 27a of a waveguide 28a is in line with the projection of axis 31 on upper surface 11 of semiconductor wafer 9. The position of end 27a of waveguide 28a in the network of ends 27 of waveguides 28 corresponds to that of the end of fiber 17a in the network of the ends of elementary fibers 17.

In FIG. 8C, at a next step corresponding to the step of FIG. 3C, semiconductor wafer 9 and elementary fiber bundle 17 have been displaced with respect to each other in direction Y to place the end of elementary fiber 17a opposite end 27a of waveguide 28a. After these steps and a possible fine adjustment step, each of the ends of elementary fibers 17 is located opposite a corresponding waveguide end 27.

Steps described in relation with FIGS. 3A to 3C, 4 to 6, and 8A to 8C may be automatically implemented by test station 1 shown in FIG. 1.

In this case, arm 7 capable of supporting holding device 15 or 157 of elementary fiber bundle 17 and/or table 5 capable of supporting semiconductor wafer 9 comprise displacement devices (not shown), for example, stepping motors or jacks, to displace the end of arm 7 and table 5 with respect to each other in directions X and Y.

Test station 1 further comprises an image processing device (not shown). The image processing device is capable of locating, due to the light diffused by the walls of elementary fiber 17a, axis 31 of elementary fiber 17a on the images supplied by image acquisition device 13. The image processing device is also capable of locating the position of a characteristic point 41 or 27a, and possibly of reference frame 33, on the images.

Test station 1 also comprises a calculation device (not shown) capable of determining and supplying, based on the various positions located and supplied by the image processing device and possible based on the knowledge of distances x0, y0, x1, and y1, signals for controlling the devices for displacing table 5 and arm 7 supporting holding device 15 or 157 of elementary fiber bundle 17.

Further, test station 1 may comprise a signal acquisition and processing device (not shown). The light and/or electric signals acquired by this device are processed to determine the time when the end of elementary fiber 17a is located opposite characteristic point 41 or 27a. The signal acquisition and processing device supplies, possibly via the calculation device, signals for controlling the devices for displacing table 5 and arms 7 supporting holding device 15 or 157 of elementary fiber bundle 17.

The calculation device, the image processing device, the image acquisition device and, possibly the signal acquisition and processing device each comprise a dedicated circuit or a circuit comprising a microprocessor associated with an instruction memory storing instructions which, when they are read by the microprocessor, enable to implement functions associated with the device. As a variation, a microprocessor and an instruction memory may be shared by the calculation device, the image processing device, and/or the signal acquisition and processing device.

Thus, test station 1 enables to automatically implement at least some of the steps of the above-described alignment method, particularly the step of aligning a characteristic point 41 or 27a of semiconductor wafer 9 in line with the projection of axis 31 of elementary fiber 17a on semiconductor wafer 9.

Specific embodiments have been described. Various alterations, modifications, and improvements will occur to those skilled in the art. In particular, term "integrated optical circuit" encompasses integrated circuits only comprising optical components, optoelectronic integrated circuits, and more generally integrated circuits comprising at least one integrated optical portion connected to at least one optical input of the circuit.

Two examples of elementary fiber bundles 17 arranged in holding devices 15 and 157, respectively, have been described. Any other device for holding an elementary fiber bundle 17 may be used as soon as:

the holding device comprises an orientation marker to orient the network of ends of elementary optical fibers of the bundle as described in relation with FIGS. 3A and 8A, and the device comprises, to locate axis 31 of elementary fiber 17a, a portion at least partially transparent to the light scattered by the walls of elementary fiber 17a or does not cover a portion of fiber 17a at the level of its end.

Further, other elementary optical fiber bundles 17 resulting in networks of coplanar ends of elementary optical fibers different from those previously described may be used. It is then provided that, at upper surface 11 of semiconductor wafer 9, ends 27 of waveguides 28 form a corresponding network.

To better locate axis 31 of elementary fiber 17a, the image acquisition device may be oriented so that its optical axis is inclined with respect to direction Z, for example, so that this optical axis is substantially orthogonal to axis 31 of fiber 17a.

It will be within the abilities of those skilled in the art to use, to form a characteristic point 41 of semiconductor wafer 9, other devices than that described in relation with FIG. 6. It is also within their abilities to modify the shape of marker 33 described in relation with FIG. 4.

Various embodiments with various variations have been described hereabove. It should be noted that those skilled in the art may combine various elements of these various embodiments and variations without showing any inventive step. In particular, the use of a marker 33 and/or of a vernier 39 may be combined with the use of a characteristic point 41. Further, the alternative embodiments described in relation with FIGS. 4, 5, and 6 in the case of bar-shaped elementary fiber bundle 17 arranged in block 15 also apply to other elementary optical fiber bundles 17 in other holding devices, for example, to the elementary fiber bundle 17 described in relation with FIGS. 7A and 7B, arranged in metal ferrule 157.

What is claimed is:

1. A method of arranging a network of coplanar ends of optical fibers of a bundle of parallel fibers opposite a corresponding network of ends of waveguides of a semiconductor wafer, the bundle of fibers and the wafer being displaceable with respect to each other in first and second orthogonal directions, the method comprising the successive steps of:
   a) arranging the fiber bundle above the wafer so that the network of coplanar ends of optical fibers and the network of ends of waveguides have the same orientation with respect to the first and second directions, and a projection of an axis of each of the fibers on the wafer is parallel to the second direction;
   b) injecting, into one of the fibers, a light beam having a wavelength such that light is scattered from the walls of the fiber, locating the fiber axis based on the scattered light, and displacing the fiber bundle and the wafer with respect to each other in the first direction to align a characteristic point of the wafer in line with the projection of the axis of the fiber on the wafer, without the end of the fiber being opposite the characteristic point; and c) displacing the fiber bundle and the wafer with respect to each other until the end of the fiber is located opposite a corresponding end of a waveguide.

2. The method of claim 1, wherein, at step c), a light beam having a wavelength adapted to the fiber is injected into the fiber.

3. The method of claim 1, wherein the fibers and the waveguides are capable of transmitting a light signal having a wavelength in the range from 1.3 to 1.5 µm.

4. The method of claim 3, wherein, at step b), the wavelength of the beam is in the range from 600 to 780 nm.

5. The method of claim 1, wherein the fibers share a same cladding.

6. The method of claim 1, wherein the fibers are organized in a bar.

7. The method of claim 1, wherein the fiber bundle is arranged in a holding device comprising an orientation marker, step a) comprising aligning the orientation marker with the first direction.

8. The method of claim 1, wherein the upper surface of the wafer is substantially parallel to the first and second directions and, at step a), the plane of the ends of the optical fibers is made substantially parallel to the first and second directions.

9. The method of claim 1, wherein the fibers are inclined with respect to the normal to the plane of the fiber ends.

10. A test station capable of implementing the method of claim 1.

11. The test station of claim 10, wherein step b) is implemented in automated fashion.

12. A method of arranging a network of coplanar ends of optical fibers of a bundle of parallel fibers opposite a corresponding network of ends of waveguides of a semiconductor wafer, the bundle of fibers and the wafer being displaceable with respect to each other in first and second orthogonal directions, the method comprising the successive steps of:

a) arranging the fiber bundle above the wafer so that the network of coplanar ends of optical fibers and the network of ends of waveguides have the same orientation with respect to the first and second directions, and a projection of an axis of each of the fibers on the wafer is parallel to the second direction;

b) injecting, into one of the fibers, a light beam having a wavelength such that light is scattered from the walls of the fiber, locating the fiber axis based on the scattered light, and displacing the fiber bundle and the wafer with respect to each other in the first direction to align a characteristic point of the wafer in line with the projection of the axis of the fiber on the wafer, without the end of the fiber being opposite the characteristic point; and c) displacing the fiber bundle and the wafer with respect to each other until the end of the fiber is located opposite a corresponding end of a waveguide, wherein the characteristic point corresponds to said end of a waveguide, step c) comprising a step c1) of displacing the wafer and the fiber bundle with respect to each other in the second direction until the end of the fiber is located opposite said point.

13. The method of claim 12, wherein, at step c1), the displacement is stopped when a quantity of light received at a level of the characteristic point is maximum.

14. The method of claim 13, wherein the wafer comprises a graduated vernier in the second direction, the method further comprising:
   at the end of step c1), locating the position of the fiber bundle on the vernier; and
   during a subsequent alignment of said ends of the fibers on said ends of waveguides, carrying out steps a) and b) and then a step of displacing the wafer and the fiber bundle with respect to each other in the second direction all the way to the located position.

15. A method of arranging a network of coplanar ends of optical fibers of a bundle of parallel fibers opposite a corresponding network of ends of waveguides of a semiconductor wafer, the bundle of fibers and the wafer being displaceable with respect to each other in first and second orthogonal directions, the method comprising the successive steps of:

a) arranging the fiber bundle above the wafer so that the network of coplanar ends of optical fibers and the network of ends of waveguides have the same orientation with respect to the first and second directions, and a projection of an axis of each of the fibers on the wafer is parallel to the second direction;

b) injecting, into one of the fibers, a light beam having a wavelength such that light is scattered from the walls of the fiber, locating the fiber axis based on the scattered light, and displacing the fiber bundle and the wafer with respect to each other in the first direction to align a characteristic point of the wafer in line with the projection of the axis of the fiber on the wafer, without the end of the fiber being opposite the characteristic point; and c) displacing the fiber bundle and the wafer with resect to each other until the end of the fiber is located opposite a corresponding end of a waveguide, wherein the characteristic point corresponds to an end of an auxiliary waveguide and the position of the characteristic point relative to said end of a waveguide is known, step c) successively comprising:

a step c1) of displacing the wafer and the fiber bundle with respect to each other in the second direction until the end of the fiber is located above the characteristic point; and a step c2) of displacing the wafer and the fiber bundle with respect to each other based on the known position of the point relative to said end of a waveguide.

* * * * *